United States Patent Office 2,904,517
Patented Sept. 15, 1959

2,904,517

PREPARATION OF STABILIZER

Paul H. Baker, Barberton, Ohio, assignor to Columbia-Southern Chemical Corporation, Allegheny County, Pa., a corporation of Delaware No Drawing. Application December 27, 1957
Serial No. 705,474

5 Claims. (Cl. 252—397)

This invention involves the provision of compositions particularly useful for stabilizing aqueous hydrogen peroxide solutions. It more particularly deals with improved methods for preparing such stabilizing compositions.

Aqueous hydrogen peroxide solutions, notably those containing 30 to 90 percent or even more hydrogen peroxide by weight, decompose upon standing. Decomposition may be even more pronounced when the solutions are stored or shipped in commonly employed containers. This decomposition can reach quite serious proportions. It decreases the hydrogen peroxide content of the solution and during the course of otherwise reasonable and expected storage periods can result in an appreciable loss of hydrogen peroxide. Rapid decomposition can be hazardous for safety reasons. For these and other reasons, stabilization of aqueous hydrogen peroxide solutions is considered good practice.

Particularly effective stabilization of aqueous hydrogen peroxide solutions results by including in the solution a minor concentration of a composition such as is prepared by mixing in aqueous media sodium stannate

$(Na_2SnO_3.3H_2O)$ sodium pyrophosphate decahydrate $(Na_4P_2O_7.10H_2O)$ and ammonium nitrate. While the stabilizing effect of this composition is outstanding, its use is not without certain difficulties. One difficulty is the tendency of a permanent precipitate to form during preparation of the stabilizing composition.

It is important to the efficient stabilization of hydrogen peroxide on a commercial scale that sizable quantities of the stabilizing composition be prepared for subsequent use in small amounts as needed. In preparing these stabilizing compositions, formation of permanent precipitates is encountered. With precipitate present, it is difficult to stabilize more effectively. For example, the separation of small amounts of the stabilizing compositions which contain the components in the proportions they are present in the system is not convenient, often impractical. Instead, the withdrawn small amounts are of varying composition due to the precipitate.

Now it has been discovered that stabilizing compositions may be prepared in a manner which precludes formation of permanent precipitates during their preparation and upon standing. Thus, in accordance with this invention, these ends may be attained in the preparation of an aqueous stabilizing solution by mixing sodium stannate, a water soluble pyrophosphate (e.g., sodium pyrophosphate decahydrate) and a suitable water soluble inorganic nitrate such as ammonium nitrate and promptly thereafter or during the mixing, adjusting the resulting solution to an alkaline pH of 9 or lower, preferably a pH between 7 and 8. By so adjusting the solution pH, formation of permanent precipitate during its preparation and during any subsequent storage is avoided.

The stabilizing solutions herein contemplated do not in themselves attain the requisite pH of 9 or lower. Hence, positive steps are employed to establish the solution at this pH.

Once a permanent precipitation occurs during preparation of the stabilizing compositions, the disadvantages arising because of a precipitate accrue. Adjustment of the solution to a pH of 9 or less is, thus, accomplished as soon as possible, usually immediately after the components of the composition are mixed. Sometimes a precipitate will begin to form. Before this precipitate becomes permanent, the solution pH is reduced as indicated.

In a typical performance of this invention, sodium stannate $(Na_2SnO_3.3H_2O)$ and sodium pyrophosphate decahydrate $(Na_4P_2O_7.10H_2O)$ are first mixed in water, following which ammonium nitrate is added. This order in which the nitrate is added last is preferred. The proportions in which these respective components are mixed is determined by their desired relative concentration for purpose of stabilization and, hence, are widely variable consistent with such ends. The degree of dilution, e.g., concentration of components, is such that when an appropriate quantity (a quantity containing sufficient amounts of the active components) of the resulting stabilizing solution is added to aqueous hydrogen peroxide the hydrogen peroxide is not unduly diluted.

Any convenient solution temperature is adequate. Usually, the stabilizing solution is prepared while the liquid temperature is between 0° C. and 70° C., preferably 20° C. to 40° C.

After mixing the components, the solution is then adjusted to a pH below about 9. The addition of any acid imparting material will accomplish this. However, it is found that certain means for reducing the pH to 9 or lower, but above 7, are best. Among other things, the introduction of ions other than those already present is preferably avoided.

According to one embodiment hereof, it has been discovered that pH adjustment as herein contemplated is attained by heating the stabilizing solution, usually to between 60° C. and 110° C., and evolving ammonia which is permitted to escape from solution.

In a further embodiment, nitric acid is added in sufficient quantity such that the pH is 9 or less. Nitric acid, hydrates thereof or aqueous solutions serve as suitable forms in which the nitric acid may be added. Nitric acid may be added to the solution of pyrophosphate and tin compounds prior to addition of ammonium nitrate to establish this pH condition or may be added after inclusion of ammonium nitrate in the solution. The quantity of nitrate which is added may take into account the nitrate ion added by the acid.

Establishment of the desired pH by the aforementioned embodiments is noteworthy because it does not entail the addition of ions other than those already present. Hence, the composition of the stabilizing solution is not altered significantly. It will naturally be understood that other acidity imparting agents are suitable in establishing the desired pH with the reservation that the ions they introduce do not deleteriously affect hydrogen peroxide solutions.

The following examples illustrate performance of this invention:

Example 1

Fifteen grams of $Na_4P_2O_7.10H_2O$ and 15.0 grams of $Na_2Sn_3.3H_2O$ were stirred with 600 grams of demineralized water at room temperature (25° C.) until solution was complete. Forty grams of $NH_4NO_3$ was then added and dissolved. While initially clear, the resulting solution soon became cloudy due to formation of a flucculent white precipitate.

As the appearance of this precipitate commenced, the solution was warmed to a temperature of from 60° C. to 65° C. and ammonia was expelled. The original solution pH of 10 to 11 was reduced in this fashion to a pH of 8 to 9 within 30 minutes. After the solution cooled to about 25° C., approximately 15 to 20 grams of demineralized water was added to restore weight loss by ammonia evolution.

The resulting solution was free of precipitate and remained so after standing in a glass bottle for a long period.

*Example II*

Thirty-seven and one-half grams of $Na_4P_2O_7 \cdot 10H_2O$ and 37.5 grams of $Na_2SnO_3 \cdot 3H_2O$ were dissolved in 1400 grams of demineralized water at room temperature (25° C.). This solution was at about pH 11. Some 32.3 grams of concentrated aqueous nitric acid (specific gravity=1.416 at 20° C.) containing 69 percent by weight $HNO_3$ (or 22.3 grams $HNO_3$) were then added and the solution pH reduced to 8. Ammonium nitrate (71.7 grams) was then dissolved in the solution and enough demineralized water was added to make the total weight of the solution 1603 grams.

Some precipitate formed upon addition of the nitric acid, but upon standing, it disappeared and the final solution was free of precipitate. Nor did precipitate form after the solution stood for a long period of time in a glass bottle.

*Example III*

The procedure of Example I was duplicated except the heating and the evolution of ammonia was omitted. A large amount of precipitate formed which did not disappear.

Stabilizing compositions prepared in this manner are effectively used in stabilizing aqueous hydrogen peroxide solutions of varying $H_2O_2$ content including those containing from 10 to 90 percent $H_2O_2$ by weight. They are especially noteworthy because of their effectiveness with the more concentrated hydrogen peroxide solutions, those having 45 percent and upwards $H_2O_2$ by weight.

It is usual to constitute the stabilizing composition such that the addition of a relatively small volume (by comparison with the peroxide solution) thereof to aqueous hydrogen peroxide solutions permits the establishment of optimum stabilization. From 80 to 300 milligrams of $Na_2SnO_3 \cdot 3H_2O$, 80 to 300 milligrams of $Na_4P_2O_7 \cdot 10H_2O$ and 350 to 600 milligrams of $NH_4NO_3$ (or equivalent $NO_3$ content) per liter of 50 percent aqueous hydrogen peroxide solution are typically used.

Among the pyrophosphates useful as stabilizers are the water soluble pyrophosphates, notably the alkali metal or ammonium pyrophosphates with or without water of hydration. Various water soluble nitrates, among which sodium nitrate and ammonium nitrate are preferred, may be used in providing stabilizing compositions prepared in the manner of this invention. Nitrates having ions which precipitate the pyrophosphate or tin compounds are generally avoided. Likewise, this invention is applicable to stabilizing compositions provided by tin compounds other than sodium stannate.

"Permanent precipitate" as herein used refers to a precipitate which does not disappear when the stabilizing solution stands unaltered.

While the present invention has been described by reference to specific details of certain embodiments, it will be understood it is not intended that the invention be construed as limited thereto except insofar as such details are recited in the appended claims.

I claim:

1. The preparation of a composition suited for the stabilization of aqueous hydrogen peroxide solutions which comprises mixing a sodium stannate, a water soluble pyrophosphate and a water soluble nitrate having an ion which does not cause precipitation of other components of the stabilizing composition in an aqueous media and altering the normal pH of the medium to an alkaline pH of less than 9 before a permanent precipitate forms.

2. The process of claim 1 wherein the phosphate is a sodium pyrophosphate and the nitrate is ammonium nitrate.

3. The preparation of a composition suited for the stabilization of aqueous hydrogen peroxide solutions which comprises mixing in water a sodium stannate, sodium pyrophosphate and ammonium nitrate to form an aqueous medium having a pH above 9 and heating the solution to evolve ammonia and lower its pH to an alkaline pH of less than 9 before a permanent precipitate forms.

4. The preparation of a composition suited for the stabilization of aqueous hydrogen peroxide solutions which comprises altering the normal pH of an aqueous medium containing a sodium stannate, a sodium pyrophosphate and ammonium nitrate to an alkaline pH of less than 9 before a permanent precipitate forms.

5. In the preparation of an aqueous composition suited for stabilization of aqueous hydrogen peroxide solutions in which sodium stannate, a sodium pyrophosphate and ammonium nitrate are dissolved, the improvement which comprises altering the normal pH of the composition to an alkaline pH of less than 9 before a permanent precipitate forms by adding nitric acid to the composition.

References Cited in the file of this patent

UNITED STATES PATENTS

| | | |
|---|---|---|
| 1,958,204 | Reichert | May 8, 1934 |
| 2,008,726 | Reichert | July 23, 1935 |
| 2,091,178 | Gilbert et al. | Aug. 24, 1937 |